(12) United States Patent
Kim

(10) Patent No.: US 10,178,340 B2
(45) Date of Patent: Jan. 8, 2019

(54) BROADCASTING SIGNAL RECEIVING APPARATUS AND CONTROL METHOD THEREOF

(71) Applicant: SAMSUNG ELECTRONICS CO., LTD., Suwon-si (KR)

(72) Inventor: Jong-hwa Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 14/829,783

(22) Filed: Aug. 19, 2015

(65) Prior Publication Data
US 2016/0057376 A1    Feb. 25, 2016

(30) Foreign Application Priority Data

Aug. 25, 2014    (KR) .................. 10-2014-0110984

(51) Int. Cl.
| | |
|---|---|
| H04N 5/50 | (2006.01) |
| H04N 5/45 | (2011.01) |
| H04N 5/445 | (2011.01) |
| H04N 21/426 | (2011.01) |
| H04N 21/431 | (2011.01) |
| H04N 21/438 | (2011.01) |

(52) U.S. Cl.
CPC ........... *H04N 5/50* (2013.01); *H04N 21/4263* (2013.01); *H04N 21/4316* (2013.01); *H04N 21/4383* (2013.01)

(58) Field of Classification Search
CPC .... H04N 19/428; H04N 19/523; H04N 19/59; H04N 5/45

USPC ....... 348/731, 732, 563, 564, 565, 570, 569; 725/38, 40

See application file for complete search history.

(56) References Cited

U.S. PATENT DOCUMENTS

| | | |
|---|---|---|
| 6,334,217 B1 | 12/2001 | Kim |
| 7,084,930 B2 | 8/2006 | Okabe |
| 2004/0001500 A1 | 1/2004 | Castillo |
| 2009/0147140 A1* | 6/2009 | Kim .................. H04N 5/45 348/565 |

(Continued)

FOREIGN PATENT DOCUMENTS

| | | |
|---|---|---|
| EP | 1926310 A1 | 5/2008 |
| JP | 3632205 B2 | 3/2005 |
| KR | 10-0309099 B1 | 12/2001 |

(Continued)

*Primary Examiner* — Michael E Teitelbaum
*Assistant Examiner* — Jean W Desir
(74) *Attorney, Agent, or Firm* — Sughrue Mion, PLLC

(57) ABSTRACT

A broadcasting signal receiving apparatus includes an input receiver configured to receive a user's input selecting a channel among a plurality of channels; a first tuner configured to tune to the channel selected by the user's input and receive a broadcast signal of the tuned channel; and a controller configured to control the first tuner to tune to a first channel and receive a broadcast signal of the first channel when a user makes the first input, and to control the first tuner to tune to a second channel and receive a broadcast signal of the second channel when a user makes a second input within a predetermined period of time after receiving the first input, wherein the first channel corresponds to the first input, and the second channel corresponds to a combination of the first input and the second input.

19 Claims, 8 Drawing Sheets

(56) References Cited

U.S. PATENT DOCUMENTS

2013/0051464 A1  2/2013  Bae
2013/0135535 A1  5/2013  Ling

FOREIGN PATENT DOCUMENTS

KR  10-2008-0039597 A  5/2008
KR  10-0841442 B1  6/2008

* cited by examiner

BROADCASTING SIGNAL RECEIVING APPARATUS AND CONTROL METHOD THEREOF

CROSS-REFERENCE TO RELATED APPLICATION

This application claims priority from Korean Patent Application No. 10-2014-0110984, filed on Aug. 25, 2014 in the Korean Intellectual Property Office, the disclosure of which is incorporated herein by reference.

BACKGROUND

Field

Apparatuses and methods consistent with exemplary embodiments relate to a broadcasting signal receiving apparatus and a control method thereof, and more particularly to a broadcasting signal receiving apparatus and a control method thereof, in which a channel changing speed is maximized.

Description of the Related Art

A set-top box or television (TV) for a digital broadcast provides many channels, and a user can select a desired channel through change of a channel in order to move to a desired channel. In the digital broadcast, a channel changing speed felt by a user corresponds to performance of a product such as the set-top box or the TV.

Channels most viewed by a user, e.g., main channels or favorite channels, are generally assigned to one-digit or two-digit channels in the existing set-top box or TV. In response to a channel changing request for moving to the one-digit or two-digit channel number, it is required to wait for about 1 to 2 seconds or additionally press an OK key after pressing a numeral key of a remote controller, thereby processing the channel changing request.

Accordingly, there is a need of not only time taken by a user to input the numeral key for changing the channel but also time taken to wait for change of the channel after inputting the numeral key, thereby causing a problem that speed of changing the channel is delayed. Further, a user's demand for more quickly changing the channel to view various channels has been increasing with gradual increase in the number of channels provided by the TV.

SUMMARY

An aspect of one or more exemplary embodiments may provide a broadcasting signal receiving apparatus which has an improved speed of changing a channel with regard to a one-digit or two-digit channel while changing the channel.

According to an aspect of an exemplary embodiment, there is provided a broadcasting signal receiving apparatus including: an input receiver configured to receive a user's input selecting a channel among a plurality of channels; a first tuner configured to tune to the channel selected by the user's input and receive a broadcast signal of the tuned channel; and a controller configured to control the first tuner to tune to a first channel and receive a broadcast signal of the first channel when a user makes the first input, and to control the first tuner to tune to a second channel and receive a broadcast signal of the second channel when a user makes a second input within a predetermined period of time after receiving the first input, wherein the first channel corresponds to the first input, and the second channel corresponds to a combination of the first input and the second input. Thus, a channel changing speed may be improved since a channel tuning process may be directly started in response to an input for a one-digit or two-digit channel. Further, a quick channel change may maximize a user's satisfaction.

The apparatus may include a display configured to display an image based on a broadcast signal of the tuned channel, wherein the controller may be configured to control the display to display an image based on a broadcast signal of the tuned channel. Thus, when the one-digit or two-digit channel may be input for changing the channel, an image of the tuned channel may be directly displayed without any standby time.

In response to receiving the second input within the predetermined period of time after the first input, the controller may be configured to control the first tuner to stop tuning to the first channel and to control the first tuner to tune to the second channel. Thus, if a user's second input is received within a predetermined period of time after the first input while a tuning process to the first channel is performed in response to the user's first input, it may be determined that a channel to be selected by the user may not be the first channel but the second channel, and thus the tuning process to the first channel may be stopped and the tuning process to the second channel may be started, thereby achieving a quick channel change.

The apparatus may include a second tuner configured to tune to a channel different from a channel tuned by the first tuner, wherein the controller may be configured to control the first tuner tune to the first channel or the second channel while the second tuner performs a tuning process. Thus the second tuner may be tuned to the currently viewed channel, and the first tuner may be tuned to a new channel corresponding to a user's input, so that change from the currently viewed channel to the new channel may be quickly performed.

The apparatus may include a display configured to display an image based on a broadcast signal of the tuned channel, wherein the controller may be configured to control the first tuner to tune to the first channel or the second channel while an image based on a broadcast signal of a channel tuned by the second tuner is displayed on the display. Thus, while the currently viewed channel is displayed on the screen, the first tuner may be prepared to be tuned to a channel corresponding to a user's input.

The first tuner may be configured to receive a broadcast signal of the first channel or second channel, lock the received broadcast signal, and decode data of the broadcast signal. Thus, the first tuner may perform tuning and decoding with regard to the channel corresponding to a user's input, thereby preparing for the change of the channel.

The controller may be configured to control the display to display an image based on a broadcast signal of the tuned channel if the first tuner is tuned to the first channel or the second channel. Thus, if the tuning process to the channel corresponding to a user's input is completed, it may be possible to view an image of the tuned channel.

The controller may be configured to control the display to display an image of the tuned channel in response to a user's input. Thus, when a predetermined user's input is given after the tuning process to the channel corresponding to a user's input is completed, an image of the tuned channel may be displayed.

The controller may be configured to control the first input to be displayed on a screen when the first input is received, and a combination of the first input and the second input to be displayed on the screen when the second input is received within the predetermined period of time after the first input.

Thus, a user may directly check the user's own selection for the channel since the first and second inputs are displayed on a screen.

The controller may be configured to release the first input or the second input from display on the screen if a second predetermined period of time elapses after the first input or if a third predetermined period of time elapses after the second input. Thus, if a predetermined period of time elapses after displaying a user's first or second input on the screen, it may be possible to enter a state for receiving a user's new input for selecting the channel.

According to an aspect of another exemplary embodiment, there is provided a method of controlling a broadcasting signal receiving apparatus, the method including: receiving a first input from a user; in response to a receiving the first input, tuning a first tuner to a first channel corresponding to the first input and receiving a broadcast signal of the first channel; receiving a second input from the user; and in response to receiving the second input within a predetermined period of time after receiving the first input; tuning the first tuner to a second channel corresponding to a combination of the first input and the second input and receiving a broadcast signal of the second channel. Thus, a channel changing speed may be improved since a channel tuning process may be directly started in response to an input for a one-digit or two-digit channel. Further, a quick channel change may maximize a user's satisfaction.

The method may further include displaying an image based on a broadcast signal of a channel tuned by the first tuner. Thus, when the one-digit or two-digit channel is input for changing the channel, an image of the tuned channel may be directly displayed without any standby time.

The method may further include stopping the first tuner from tuning to the first channel when the second input is received within a predetermined period of time after the first input. Thus, if a user's second input is received within a predetermined period of time after the first input while a tuning process to the first channel is performed in response to the user's first input, it may be determined that a channel to be selected by the user is not the first channel but the second channel, and thus the tuning process to the first channel may be stopped and the tuning process to the second channel may be started, thereby achieving a quick channel change.

The method may further include tuning the first tuner to the first channel or the second channel while a second tuner is being tuned to a channel different from the channel tuned by the first tuner. Thus, the second tuner may be tuned to the currently viewed channel, and the first tuner may be tuned to a new channel corresponding to a user's input, so that change from the currently viewed channel to the new channel can be quickly performed.

The method may further include tuning the first tuner to the first channel or the second channel while displaying an image based on a broadcast signal of the channel tuned by the second tuner. Thus, while the currently viewed channel is displayed on the screen, the first tuner may be prepared to be tuned to a channel corresponding to a user's input.

The method may further include receiving by the first tuner a broadcast signal of the first channel or second channel, locking the received broadcast signal, and decoding data of the broadcast signal. Thus, the first tuner may perform tuning and decoding with regard to the channel corresponding to a user's input, thereby preparing for the change of the channel.

The method may further include displaying an image based on a broadcast signal of the tuned channel if the first tuner is tuned to the first channel or the second channel. Thus, if the tuning process to the channel corresponding to a user's input is completed, it may be possible to view an image of the tuned channel.

The method may further include displaying an image of the tuned channel in response to a user's input. Thus, when a predetermined user's input is given after the tuning process to the channel corresponding to a user's input is completed, an image of the tuned channel may be displayed.

The method may further include displaying the first input on a screen when the first input is received, and displaying a combination of the first input and the second input on the screen when the second input is received within a predetermined period of time after the first input. Thus, a user may directly check the user's own selection for the channel since the first and second inputs may be displayed on a screen.

The method may further include releasing the first input or the second input from display on the screen if second predetermined period of time elapses after the first input or if third predetermined period of time elapses after the second input. Thus, if a predetermined period of time elapses after displaying a user's first or second input on the screen, it may be possible to enter a state for receiving a user's new input for selecting the channel.

According to an aspect of another exemplary embodiment, there is provided a method of receiving one or more broadcast signals, the method including: receiving a first input from a user; in response to receiving the first input, receiving by a tuner a first broadcast signal associated with a first channel, the first channel corresponding to the first input; receiving a second input from the user; determining whether the second input was received within a predetermined period of time after receiving the first input; and if the second input was received within the predetermined period of time, receiving by the tuner a second broadcast signal associated with a second channel, the second channel corresponding to a combination of the first input and the second input.

The method may further include, in response to receiving by the tuner the first broadcast signal, displaying on a display a first image received from the first broadcast signal; and in response to receiving by the tuner the second broadcast signal, displaying on the display a second image received from the second broadcast signal.

The method may further include, in response to determining whether the second input was received within the predetermined period of time, if the second input is not received within the predetermined period of time, displaying on a display a first image received from the first broadcast signal, and if the second input is received within the predetermined period of time, displaying on the display a second image received from the second broadcast signal.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Hereinafter, exemplary embodiments will be described in detail with reference to accompanying drawings so as to be easily materialized by a person having an ordinary skill in the art. The present disclosure may be achieved in various forms and not limited to the following embodiments. For convenience of description, parts not directly related to the present disclosure are omitted, and like numerals refer to like elements throughout.

Figure 1:
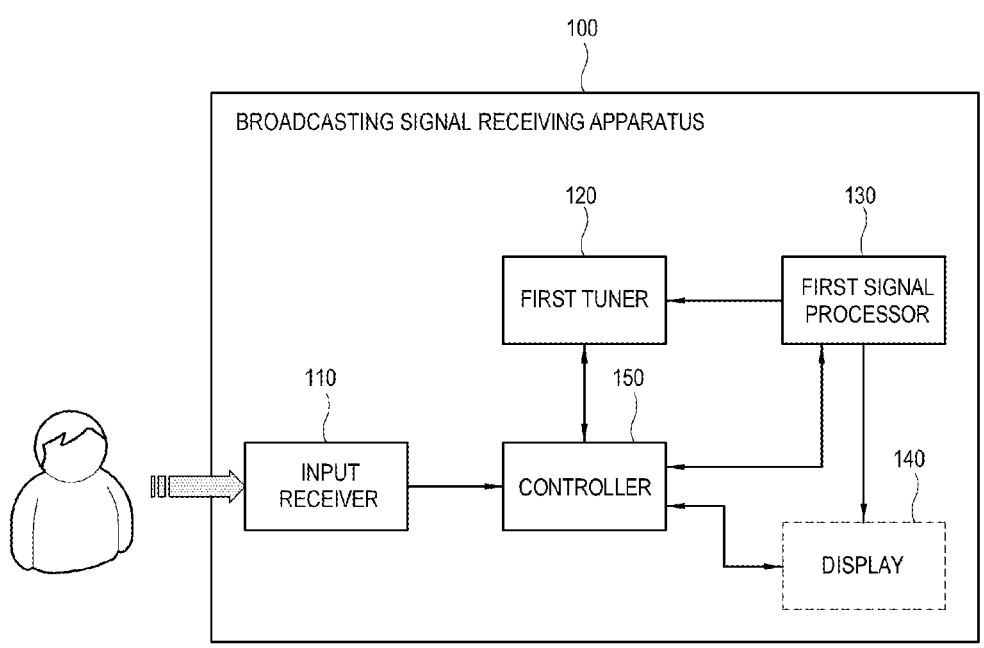
FIG. 1 is a block diagram of a broadcasting signal receiving apparatus according to an exemplary embodiment.

Below, elements of a broadcasting signal receiving apparatus according to an exemplary embodiment will be described first with reference to FIG. 1 and then FIGS. 3 to 7 as necessary. FIG. 1 is a block diagram of a broadcasting signal receiving apparatus according to an exemplary embodiment. As shown in FIG. 1, a broadcasting signal receiving apparatus 100 includes an input receiver 110, a first tuner 120, a first signal processor 130, and a controller 150. The broadcasting signal receiving apparatus 100 may for example be achieved by a television (TV) or a set-top box. According to another exemplary embodiment, the broadcasting signal receiving apparatus 100 may further include a display 140. When the broadcasting signal receiving apparatus 100 receives a user's first input, the first tuner 120 is tuned to a first channel corresponding to the first input and receives a broadcast signal of the first channel. If the broadcasting signal receiving apparatus 100 receives a user's second input within a predetermined period of time after receiving the first input, the first tuner 120 is tuned to a second channel corresponding to combination of the first and second inputs and receives a broadcast signal corresponding to the second channel.

In light of changing a channel, the broadcasting signal receiving apparatus 100 according to an exemplary embodiment is advantageous to improve a channel changing speed and maximize a user's satisfaction through the quick channel change since it directly starts being tuned to a channel in response to an input for a one-digit or two-digit channel.

The input receiver 110 receives a user's input for selecting one channel among a plurality of channels. For example, the input receiver 110 may receive a user's input through a remote controller. According to an exemplary embodiment, the input receiver 110 may receive an input corresponding to a numeral key as a user's input. Alternatively, the input receiver 110 may receive an input corresponding to not the numeral key but a letter key. In some exemplary embodiments, a user's input for selecting a channel may be variously achieved without being limited to the input of the numeral or letter key.

The first tuner 120 may be tuned to a channel selected by a user's input and receive a broadcast signal of the tuned channel. The first tuner 120 receives a broadcast signal of the selected channel, and performs locking with regard to the received broadcast signal. The first tuner 120 may be variously configured in accordance with formats of a broadcast signal to be received and types of the broadcasting signal receiving apparatus 100. For example, the first tuner 12 may be configured to receive a radio frequency (RF) broadcast signal from a broadcasting station or to receive a satellite signal.

The first signal processor 130 may perform a signal processing process with regard to a broadcast signal received in the first tuner 120. There is no limit to the kind of signal processing processes performed in the first signal processor 130, and the signal processing processes may for example include decoding data of a broadcast signal.

According to an exemplary embodiment, the first signal processor 130 may be included in the first tuner 120. In this case, the first tuner 120 receives a broadcast signal of a channel selected by a user's input, locks the received broadcast signal, and applies the signal processing process such as the decoding to data of the received broadcast signal.

The controller 150 controls the first tuner 120 to be tuned to a first channel corresponding to a first input when a user's first input is received and receive a broadcast signal of the first channel. If a user's second input is received within a predetermined period of time after receiving the first input, the controller 150 controls the first tuner 120 to be tuned to a second channel corresponding to combination of the first input and the second input and receive a broadcast signal of the second channel. Detailed examples will be described with reference to FIGS. 3 to 5.

Figure 3:
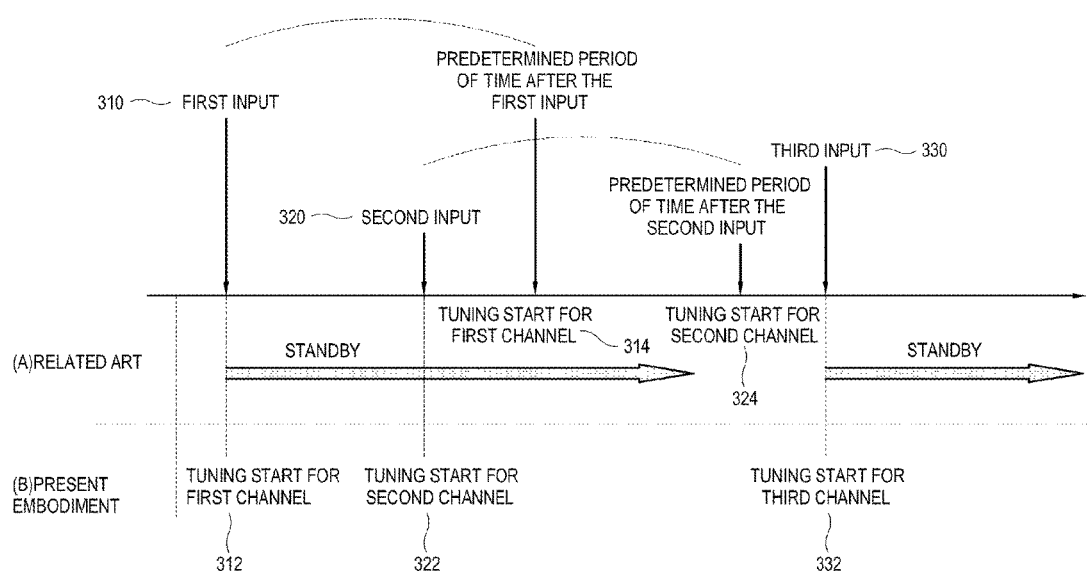
FIG. 3 shows an example of comparison between a tuning start point of time according to an exemplary embodiment and that of the related art with regard to a selected channel in response to a user's input.

FIG. 3 shows an example of comparison between a tuning start point of time according to an exemplary embodiment and that of the related art with regard to a selected channel in response to a user's input. As shown in FIG. 3, in the case of the related art (A), if a user's first input for changing to a first channel is received (310), a tuning process to the first channel is started after a lapse of a predetermined period of time (314). If the first input and the second input for changing to the second channel are received (310, 320), a tuning process to the second channel is started after a lapse of a predetermined period of time (324). Therefore, in the case of the related art (A), a standby time for the tuning is required while the channel is changed in accordance with a user's input, and thus the channel changing speed is relatively slow.

Referring to FIG. 3, in the case of the present embodiment (B), if a user's first input is received (310), a tuning process to the first channel corresponding to the first input is directly started to receive a broadcast signal of the first channel (312). If a second input is received within a predetermined period of time after receiving the first input (320), a tuning process to the second channel is directly started to receive a broadcast signal of the second channel (322). Thus, in the case of the present embodiment (B), if a user's input for changing a channel is received, a tuning process to the channel corresponding to each input is directly started, thereby having an effect on preparing for a quick channel change.

Figure 4:
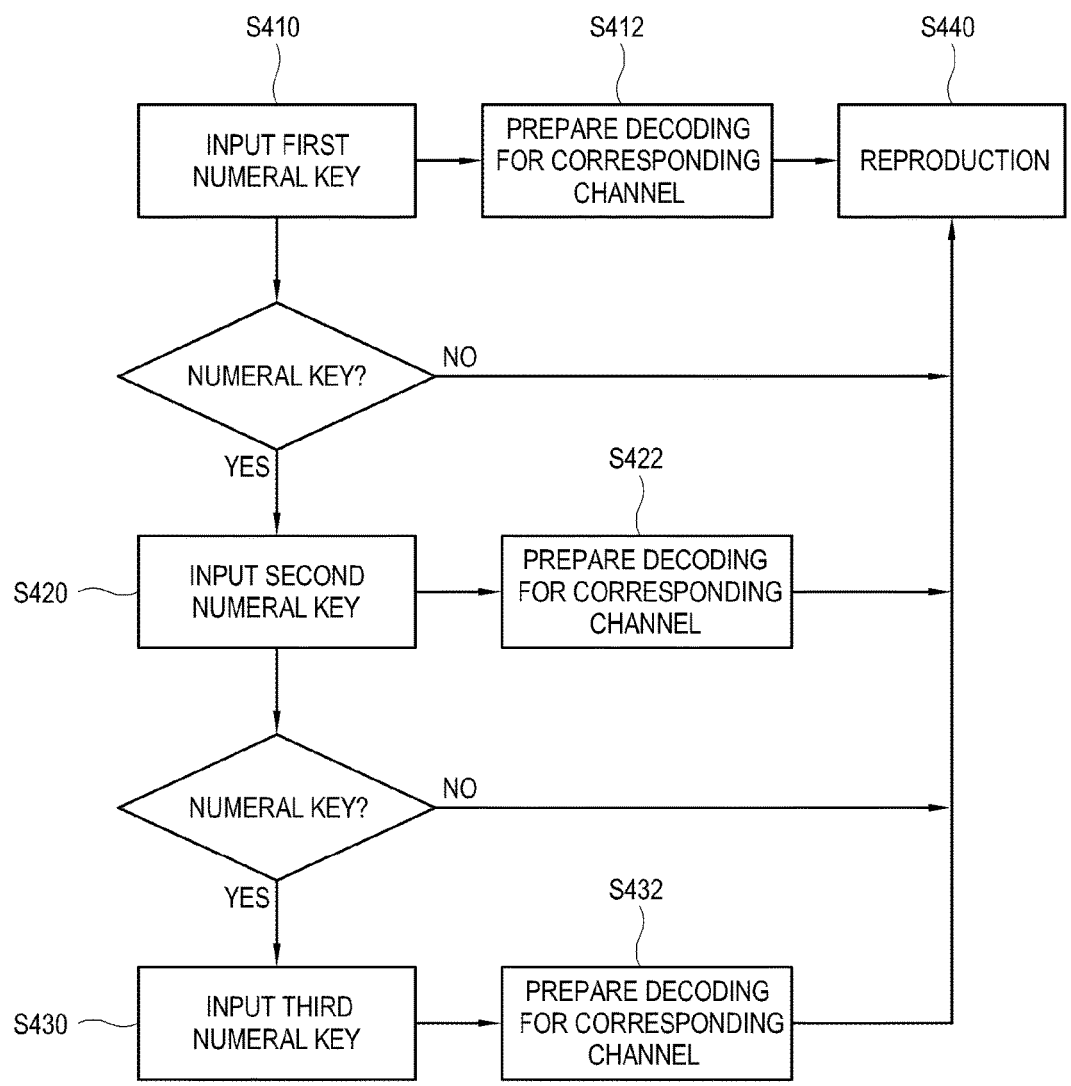
FIG. 4 is a flowchart showing operations of a broadcasting signal receiving apparatus according to an exemplary embodiment with regard to a user's input of a numeral key.

FIG. 4 is a flowchart showing operations of a broadcasting signal receiving apparatus according to an exemplary embodiment with regard to a user's input of a numeral key. As shown in FIG. 4, if a first numeral key is input at operation S410, decoding for a channel corresponding to the first numeral key is prepared at operation S412. If the decoding is completed, an image of the corresponding channel is reproduced at operation S440. If there is no additional input of a numeral key after the operation S410, the decoded image of the corresponding channel is reproduced in the operation S440. If a second numeral key is input at operation S420, decoding for a channel corresponding to combination of the first numeral key and the second numeral key is prepared at operation S422. If the decoding is completed, an image of the corresponding channel is reproduced at operation S440. Likewise, if there is no addition input of a numeral key after the operation S420, the decoded image of the corresponding channel is reproduced in the operation S440. If a second numeral key is input at operation S430, decoding for a channel corresponding to combination of the first numeral key, the second numeral key and the third numeral key is prepared at operation S432. If the decoding is completed, an image of the corresponding channel is reproduced at operation S440.

Figure 5:
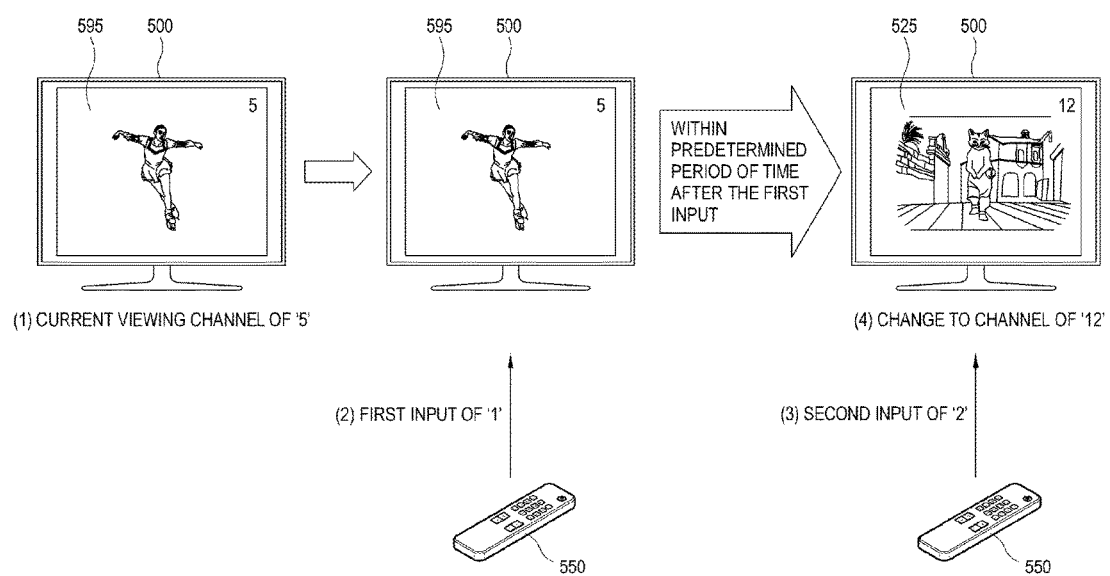
FIG. 5 shows an example of displaying an image of a channel selected in response to a user's input according to an exemplary embodiment.

Specifically, as shown in FIG. 5, suppose that a user wants to change a currently viewing channel of '5' to a channel of '12'. When '1' is input as a first input through a remote controller 550, the controller 150 performs control to be tuned to a channel of '1' corresponding to the input of '1' and receive a broadcast signal of the channel of '1'. When '2' is additionally input as a second input within a predetermined period of time after the input of '1', the controller 150 performs control to be tuned to a channel of '12' corresponding to combination of '1' and '2' and receive a broadcast signal of the channel of '12'. Thus, if a user changes a channel in a TV, tuning is directly started without any standby time for his/her first and second inputs, thereby achieving a quick channel change.

According to an exemplary embodiment, the broadcasting signal receiving apparatus 100 may further include a display 140 to display an image based on a received broadcast signal of a tuned channel, and the controller 150 may control the display 140 to display an image of a received broadcast signal of a channel tuned by the first tuner 120.

According to an exemplary embodiment, as shown in FIG. 5, if a user inputs '1' through the remote controller 550 while currently viewing an image 595 corresponding to the channel of '5', a tuning process to the corresponding channel of '1' is started but the image 595 of the viewing channel of '5' is maintained and displayed as it is. In addition, if a user inputs '2' within a predetermined period of time after inputting '1' and then has no additional input or presses an OK button through the remote controller 550, a tuning process to the channel of '12' corresponding to combination of '1' and '2' is started, thereby displaying an image 525 of the tuned channel of '12' on a screen.

Figure 6:
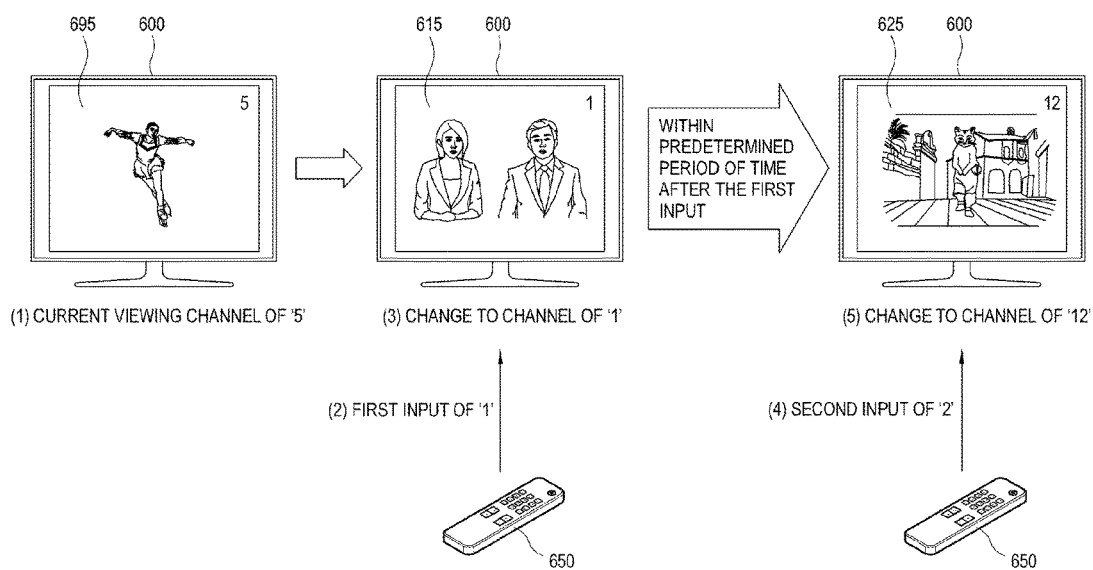
FIG. 6 shows an example of displaying an image of a channel selected in response to a user's input according to an exemplary embodiment.

In another exemplary embodiment, as shown in FIG. 6, if a user inputs '1' through a remote controller 650 while currently viewing an image 695 corresponding to the channel of '5', a tuning process to the corresponding channel of '1' is started and an image 615 of the tuned channel of '1' is displayed. In addition, if a user inputs '2' within a predetermined period of time after inputting '1' and then has no additional input or presses an OK button through the remote controller 650, a tuning process to the channel of '12' corresponding to combination of '1' and '2' is started, thereby changing and displaying the image 615 of the channel of '1' into an image 625 of the tuned channel of '12' on a screen.

If the second input is received within a predetermined period of time after receiving the first input, the controller 150 stops being tuned to a first channel and receiving a broadcast signal of the first channel, and controls to be tuned to a second channel and receive a broadcast signal of the second channel. For example, referring to FIG. 5, if a user inputs '2' through the remote controller 550 within a predetermined period of time while being tuned to the channel of '1' corresponding to a user's input of '1', a tuning process to the channel of '1' is stopped and a tuning process to the channel of '12' is performed.

If the tuning process to the first or second channel is completed and a broadcast signal of the first or second channel is received, the controller 150 may control the display 140 to display an image based on the received broadcast signal of the tuned channel. For example, as shown in FIG. 6, if the tuning process to the channel of '1' corresponding to a user's input of '1' is completed, the image 615 of the tuned channel of '1' is displayed. In addition, if '2' is input within a predetermined period of time after inputting '1', a tuning process to the channel of '12' is performed. If the tuning process to the channel of '12' is completed, the image 625 corresponding to the channel of '12' is displayed on a screen. For example, if a user inputs a numeral key for selecting a channel, an image of a one-digit channel tuned corresponding to an input of a first numeral key may be displayed. If a second numeral key is input within a predetermined period of time after inputting the first numeral key, and an image of a two-digit channel tuned corresponding to combination of the first numeral key and the second numeral key may be displayed. In this case, it is advantageous for a user to complete selection of a channel by checking an image of a corresponding channel whenever a numeral key is input.

If there is a user's input, the controller 150 may control the display to display an image of a tuned channel. For example, as shown in FIG. 5, if a user inputs '1' as a first input through the remote controller 550 in order to change the currently viewing channel of '5' into a channel of '12', a tuning process to the channel of '1' is started to receive a broadcast signal of the tuned channel of '1'. Then, '2' is input as a second input within a predetermined period of time after inputting '1', a tuning process to the channel of '12' is started in order to receive a broadcast signal of the tuned channel of '12'. At this time, if a user makes a predetermined input such as press of the OK button through the remote controller after inputting '2', an image corresponding to the tuned channel of '12' may be directly displayed.

Figure 7:
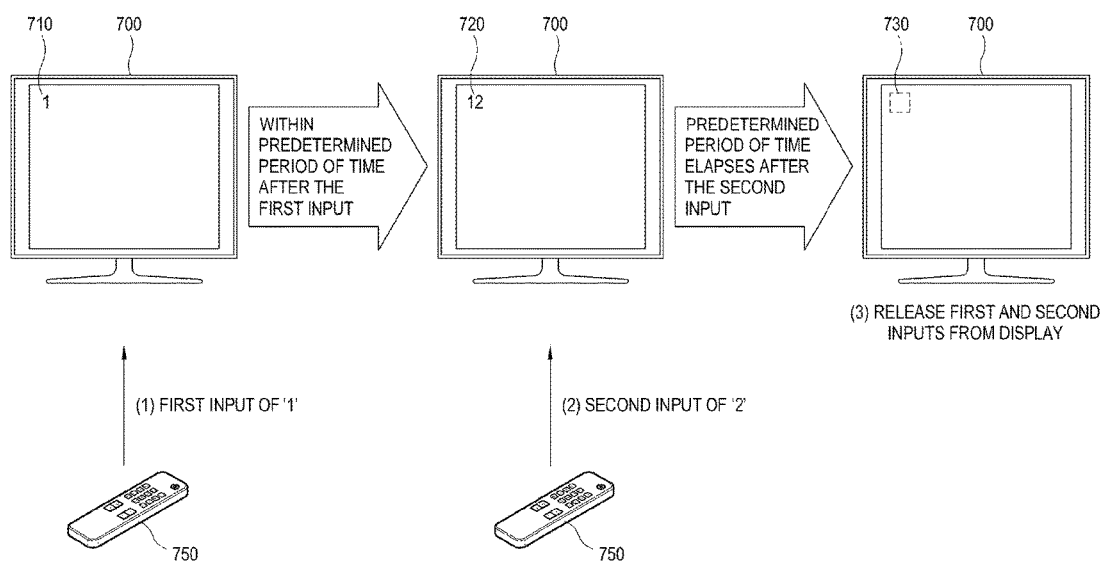
FIG. 7 shows an example of displaying and releasing a user's input on a screen according to an exemplary embodiment.

The controller 150 may perform control to display a first input on a screen if the first input is received, and display combination of the first input and a second input on the screen if the second input is received within a predetermined period of time after receiving the first input. For example, as shown in FIG. 7, if a user inputs '1' 710 as the first input though a remote controller 750, '1' 710 may be displayed in a predetermined area on the screen. If '2' is input as the second input within a predetermined period of time after inputting '1', combination of '1' and '2', i.e. '12' 720 may be displayed in the predetermined area on the screen. That is, the first input is first displayed and the second input is then additionally displayed if the first input and the second input are received in sequence for changing the channel, thereby allowing a user to select a channel while directly checking the first input and the second input on the screen If a predetermined period of time elapses after receiving the first input or a predetermined period of time elapses after receiving the second input, the controller 150 may release the display of the first input or the second input. For example, as shown in FIG. 7, if a predetermined period of time elapses after displaying '12' 720 based on a user's second input within a predetermined period of time from the display of '1' based on a user's first input, it is determined that the first input or the first and second input are not maintained any more, and the '12' 720 is released from the display (see 730 in FIG. 7). After releasing the display of the first and second inputs, a user can make a new input for selecting a channel again.

Figure 2:
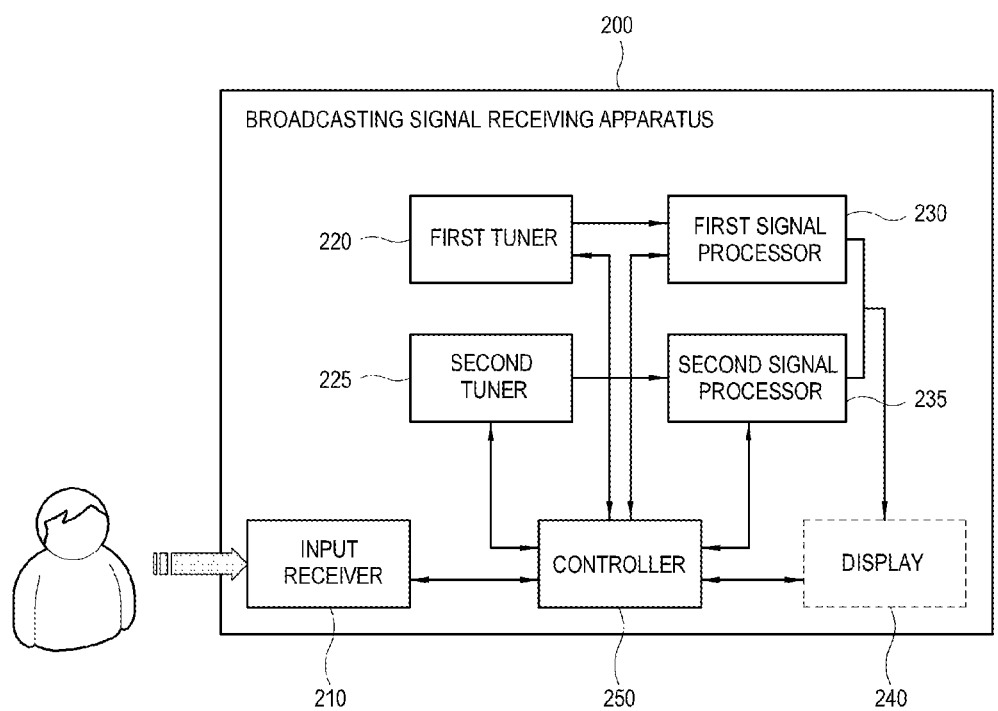
FIG. 2 is a block diagram of a broadcasting signal receiving apparatus according to an exemplary embodiment.

FIG. 2 is a block diagram of a broadcasting signal receiving apparatus according to an exemplary embodiment. As shown in FIG. 2, the broadcasting signal receiving apparatus 200 includes an input receiver 210, a first tuner 220, a second tuner 225, a first signal processor 230, a second signal processor 235, and a controller 250. In addition, the broadcasting signal receiving apparatus 200 may further include a display 240. For example, the broadcasting signal receiving apparatus 200 may be achieved by a TV or a set-top box. The input receiver 210 may correspond to the input receiver 110 of FIG. 1, the display 240 may correspond to the display 140 of FIG. 1, the first tuner 220 may correspond to the first tuner 120 of FIG. 1, and the first signal processor 230 may correspond to the first signal processor 130 of FIG. 1, and thus repetitive descriptions thereof will be avoided.

The second tuner 225 may be tuned to a channel different from the channel tuned by the first tuner 220 and receive a broadcast signal of the tuned channel. The second tuner 225 receives a broadcast signal of a certain channel and performs locking with regard to the received broadcast signal.

The second signal processor 235 may for example perform a signal processing process such as decoding with regard to the broadcast signal received in the second tuner 225.

According to an exemplary embodiment, the second signal processor 235 may be included in the second tuner 225. In this case, the second tuner 225 receives a broadcast signal of a certain channel, locks the received broadcast signal, and performs the signal processing process such as the decoding or the like with regard to the received broadcast signal.

The controller 250 may control the first tuner 220 to be tuned to a first channel or a second channel and receive a broadcast signal of the tuned channel while tuning of the second tuner 225 is performed. Further, the controller 250 may control the first tuner 220 to be tuned to a first channel or a second channel and receive a broadcast signal of the tuned channel while an image based on a broadcast signal of a channel tuned by the second tuner 225 is displayed on the display 240. For example, the second tuner 225 may be tuned to the channel of '5', which is currently viewed by a user as shown in FIG. 5, and the first tuner 220 may be tuned to the channel of '1' when the user makes an input of '1' through the remote controller 550. Further, if a user makes an input of '2' within a predetermined period of time after making an input of '1', the first tuner 220 may be tuned to the channel of '12' corresponding to combination of '1' and '2'. In this case, the channel of '5' which is currently viewed by a user is tuned by the second tuner 225 so that the user can continuously view the image 595 corresponding to the channel of '5', but another channel corresponding to the user's input for changing the channel is tuned by not the second tuner 225 but the first tuner 220, thereby efficiently and quickly changing the channel. Further, two such tuners are respectively tuned to a currently viewing channel and a channel corresponding to a user's input, and it is thus convenient for a user since the image of the currently viewing channel is maintained without performing a new tuning process when the user cancels the change of the channel.

Figure 8:
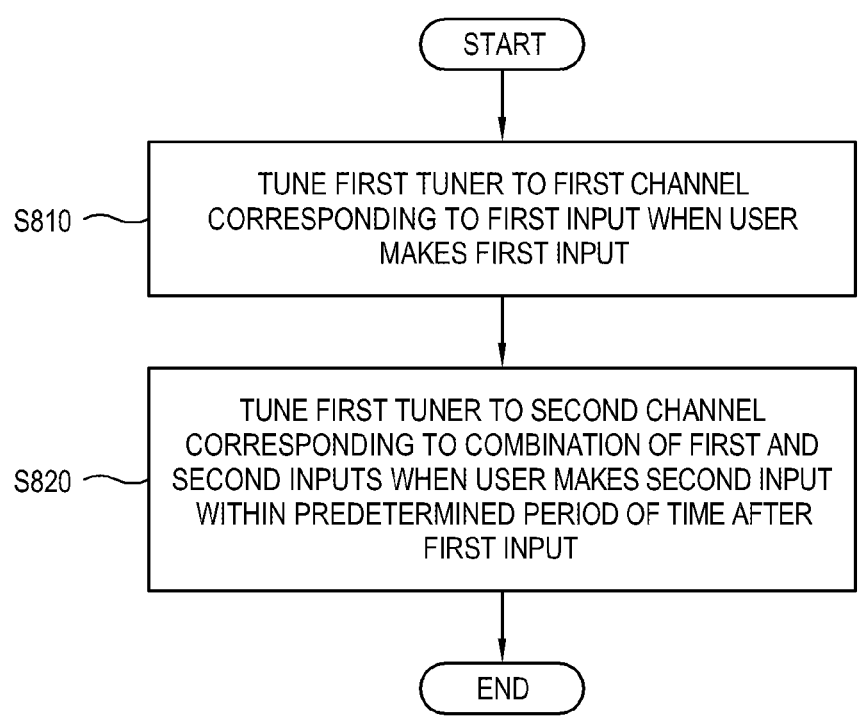
FIG. 8 is a flowchart showing a method of controlling broadcasting signal receiving apparatus according to an exemplary embodiment.

FIG. 8 is a flowchart showing a method of controlling broadcasting signal receiving apparatus according to an exemplary embodiment. As shown in FIG. 8, if a user's first input is received at operation S810, the first tuner is tuned to a first channel corresponding to the first input and receives a broadcast signal of the first channel. Next, at operation S820, if a user's second input is received within a predetermined period of time after receiving the first input, the first tuner is tuned to a second channel corresponding to combination of the first input and the second input and receives a broadcast signal of the second channel. Further, there may be added an operation of displaying an image based on the broadcast signal of the channel tuned by the first tuner. For example, as shown in FIG. 5, if a user makes an input of '1' through the remote controller 550 while currently viewing the image 595 corresponding the channel of '5', the tuning process to the channel of '1' is started. Then, if '2' is input within a predetermined period of time after inputting '1', a tuning process to the channel of '12' corresponding to combination of '1' and '2' is started to display the image 525 of the tuned channel of '12'.

According to an exemplary embodiment, if the second input is received within a predetermined period of time after receiving the first input, the tuning process to the first channel is stopped and the tuning process to the second channel is started. For example, as shown in FIG. 5, if a user makes an input of '2' within a predetermined period of time while the tuning process to the channel of '1' corresponding to a user's input of '1' is performed, the tuning process to the channel of '1' is stopped and the tuning process to the channel of '12' is started.

In some exemplary embodiments, the operation S810 of being tuned to the first channel and the operation S810 of being tuned to the second channel may further include operations of receiving the broadcast signal of the first or second channel, locking the received broadcast signal, and decoding data of the broadcast signal.

After the tuning process to the first channel or the second channel is completed to receive the broadcast signal, there may be added an operation of displaying an image of the tuned channel. For example, as shown in FIG. 6, if the tuning process to the channel of '1' corresponding to a user's input of '1' is completed, the image 615 of the tuned channel of '1' may be displayed on the screen. Further, if '2' is input within a predetermined period of time after inputting '1', the tuning process to the channel of '12' is performed and the image 625 corresponding to the tuned channel of '12' may be displayed when the tuning process is completed.

In some exemplary embodiments, an image corresponding to a tuned channel may be displayed in response to a user's input. For example, as shown in FIG. 5, if a user makes an input of '1' as a first input, a tuning process to the channel of '1' is performed to receive a broadcast signal of the tuned channel of '1'. Then, if a user makes an input of '2' as a second input within a predetermined period of time after the input of '1', a tuning process to the channel of '12' is performed to receive a broadcast signal of the tuned channel of '12'. If a user makes a predetermined input such as press of an OK button on a remote controller after the input of '2', an image corresponding to the channel of '12' may be directly displayed.

According to another exemplary embodiment, a first input may be displayed on a screen if the first input is received, and combination of the first input and a second input may be displayed on the screen if the second input is received within a predetermined period of time after receiving the first input. Further, if a predetermined period of time elapses after the first input, or if a predetermined period of time elapses after the second input, the display of the first input or the second input may be released. For example, as shown in FIG. 7, if a user makes an input of '1' as the first input through the remote controller 750, '1' 710 may be displayed in a predetermined area on the screen. If a user makes an input of '2' as the second input within a predetermined period of time after the input of '1', combination of '1' and '2', i.e. '12' 720 may be displayed in the predetermined are on the screen. Further, if a predetermined period of time elapses after displaying '12' 720 on the screen, it is determined that a user's first and second inputs are not maintained any more, and thus the '12' 720 is released from the display (see 730 in FIG. 7).

While the second tuner is tuned to a channel different from the channel tuned by the first tuner and receives a broadcast signal of the tuned channel, the first tuner may be tuned to the first channel or the second channel and receive a broadcast signal of the tuned channel. Further, while an image of a broadcast signal of the channel tuned by the second tuner is displayed, the first tuner may be tuned to the first channel or the second channel and receive the broadcast signal of the tuned channel. For example, as shown in FIG. 5, the channel of '5' which is currently viewed by a user is tuned by the second tuner, and a channel of '1' corresponding to an input of '1' is tuned by the first tuner when a user makes the input of '1'. In addition, if a user makes an input of '2' within a predetermined period of time after the input of '1', a channel of '12' corresponding to combination of '1' and '2' may be tuned by the first tuner.

In the foregoing broadcasting signal receiving apparatus according to an exemplary embodiment, a tuning process to a first channel corresponding to a user's first input may be performed when the first input is received, and a tuning process to a second channel corresponding to combination of the first input and a second input is performed when the second input is received within a predetermined period of time after receiving the first input, thereby improving a channel changing speed when a one-digit or two-digit channel is input.

Further, according to an exemplary embodiment, a quick channel change can maximize a user's satisfaction.

Although a few exemplary embodiments have been shown and described, it will be appreciated by those skilled in the art that changes may be made in these exemplary embodiments without departing from the principles and spirit of thereof, the scope of which is defined in the appended claims and their equivalents.

What is claimed is:

1. A broadcasting signal receiving apparatus comprising:
a first tuner configured to receive a broadcast signal of one of channels;
an input receiver configured to receive a user's input selecting one of the channels;
a display configured to display an image of the broadcast signal; and
a controller configured to:
in response to a first input of a first number being received, display the first number on the display and control the first tuner to tune a broadcast signal of a first channel corresponding to the first number,
in response to a second input of a second number being received within a predetermined period of time while tuning to the first channel corresponding to the first number after receiving the first input, display a third number which is a combination of the first number and the second number on the display, control the first tuner to tune a broadcast signal of a second channel corresponding to the third number, and display an image of the second channel on the display, and
in response to the second input of the second number being received after the predetermined period of time while tuning to the first channel corresponding to the first number after receiving the first input, display the second number without the first number on the display, control the first tuner to tune a broadcast signal of a third channel corresponding to the second number, and display an image of the third channel on the display,
wherein each of the first number and the second number corresponds to a respective single key input.

2. The broadcasting signal receiving apparatus according to claim 1, wherein, in response to receiving the second input within the predetermined period of time after the first input, the controller is configured to control the first tuner to stop tuning to the first channel and to control the first tuner to tune to the second channel.

3. The broadcasting signal receiving apparatus according to claim 1, further comprising a second tuner configured to tune to a channel different from a channel tuned by the first tuner,
wherein the controller is configured to control the first tuner to tune to the first channel or the second channel while the second tuner performs a tuning process.

4. The broadcasting signal receiving apparatus according to claim 3,
wherein the controller is configured to control the first tuner to tune to the first channel or the second channel while an image based on a broadcast signal of a channel tuned by the second tuner is displayed on the display.

5. The broadcasting signal receiving apparatus according to claim 1, wherein the first tuner is configured to receive the broadcast signal of the first channel or the broadcast signal of the second channel, lock the received broadcast signal, and decode data of the broadcast signal.

6. The broadcasting signal receiving apparatus according to claim 1, wherein the controller is configured to control the display to display an image based on the broadcast signal of the first channel or the broadcast signal of the second channel if the first tuner is tuned to the first channel or the second channel.

7. The broadcasting signal receiving apparatus according to claim 1, wherein the controller is configured to control the display to display an image of the first channel or the second channel in response to a user's input.

8. The broadcasting signal receiving apparatus according to claim 1, wherein the controller is configured to release the first input or the second input from display on the display if a second predetermined period of time elapses after the first input or if a third predetermined period of time elapses after the second input.

9. A method of controlling a broadcasting signal receiving apparatus, the method comprising:
displaying an image of the broadcast signal;
in response to a receiving a first input of a first number, displaying the first number and tuning, by a first tuner, a broadcast signal of a first channel corresponding to the first number;
in response to receiving a second input of a second number within a predetermined period of time while tuning to the first channel corresponding to the first number after receiving the first input, displaying a third number which is a combination of the first number and the second number, tuning, by the first tuner, a broadcast signal of a second channel corresponding to the third number, and displaying an image of the second channel, and in response to the second input of the second number being received after the predetermined period of time while tuning to the first channel corresponding to the first number after receiving the first input, displaying the second number without the first number, tuning, by the first tuner, a broadcast signal of a third channel corresponding to the second number, and displaying an image of the third channel, wherein each of the first number and the second number corresponds to a respective single key input.

10. The method according to claim 9, further comprising stopping the first tuner from tuning to the first channel when the second input is received within the predetermined period of time after the first input.

11. The method according to claim 9, further comprising, tuning the first tuner to the first channel or the second channel while a second tuner is being tuned to a channel different from the channel tuned by the first tuner.

12. The method according to claim 11, further comprising, tuning the first tuner to the first channel or the second channel while displaying an image based on a broadcast signal of the channel tuned by the second tuner.

13. The method according to claim 9, further comprising, receiving by the first tuner a broadcast signal of the first channel or the second channel, locking the received broadcast signal, and decoding data of the received broadcast signal.

14. The method according to claim 9, further comprising displaying an image based on the broadcast signal of the first channel or the broadcast signal of the second channel if the first tuner is tuned to the first channel or the second channel.

15. The method according to claim 9, further comprising displaying an image of the first channel or the second channel in response to a user's input.

16. The method according to claim 9, further comprising releasing the first input or the second input from display on the display if second predetermined period of time elapses after the first input or if third predetermined period of time elapses after the second input.

17. A method of receiving one or more broadcast signals, the method comprising:

displaying an image of the broadcast signal;

in response to receiving a first input of a first number, displaying the first number and tuning by a tuner a broadcast signal of a first channel corresponding to the first number of the broadcast signal;

determining whether a second input of a second number is received within a predetermined period of time while tuning to the first channel corresponding to the first number after receiving the first input;

in response to the second input of the second number being received within the predetermined period of time while tuning to the first channel corresponding to the first number, displaying a third number which is a combination of the first number and the second number, tuning by the tuner a broadcast signal of a second channel corresponding to the third number, and displaying an image of the second channel, and in response to the second input of the second number being received after the predetermined period of time while tuning to the first channel corresponding to the first number, displaying the second number, tuning, by the tuner, a broadcast signal of a third channel corresponding to the second number, and displaying an image of the third channel, wherein each of the fast number and the second number corresponds to a respective single key input.

18. The method of claim 17, further comprising:

in response to receiving by the tuner the first broadcast signal, displaying on a display a first image received from the first broadcast signal; and in response to receiving by the tuner the second broadcast signal, displaying on the display a second image received from the second broadcast signal.

19. The method of claim 17, further comprising, in response to determining whether the second input was received, within the predetermined period of time, if the second input is not received within the predetermined period of time, displaying on a display a first image received from the first broadcast signal, and if the second input is received within the predetermined period of time, displaying on the display a second image received from the second broadcast signal.

* * * * *